United States Patent [19]

Matthews

[11] 4,454,805

[45] Jun. 19, 1984

[54] STOVE TOP GRILL

[76] Inventor: Frank H. Matthews, 18469 Marimba St., Rowland Heights, Calif. 91748

[21] Appl. No.: 269,700

[22] Filed: Jun. 2, 1981

[51] Int. Cl.³ .............................................. A47J 37/06
[52] U.S. Cl. ...................................... 99/400; 99/401; 99/446
[58] Field of Search .............. 126/18, 27, 37 R, 37 A, 126/37 B, 39 B, 39 C, 39 D, 39 J, 39 K, 41 D, 41 E, 41 R, 214 D, 215, 19 M, 51, 25 R, 25 A, 38, 218; 99/400, 401, 446, 447; 219/340, 405, 454, 472; 220/85 K, 70

[56] References Cited

U.S. PATENT DOCUMENTS

| | | | |
|---|---|---|---|
| 84,758 | 12/1868 | Phelps | 99/400 X |
| 242,424 | 6/1881 | Bentley | 99/401 X |
| 507,828 | 10/1893 | Montanus | 126/38 |
| 580,753 | 4/1897 | Barnard | 99/400 X |
| 693,725 | 2/1902 | Leland | 99/446 |
| 710,786 | 10/1902 | Leland | 99/446 |
| 739,214 | 9/1903 | Phillips | 99/446 |
| 806,475 | 12/1905 | Koneman | 99/446 |
| 904,382 | 12/1908 | Van Patten | 99/400 X |
| 1,178,298 | 4/1916 | Carlton | 99/447 |
| 1,192,306 | 7/1916 | Heiser | 99/446 |
| 1,762,257 | 6/1930 | Burkhardt | 99/401 X |
| 1,801,387 | 4/1931 | Routman | 220/85 K |
| 1,970,075 | 8/1934 | Buckland | 219/454 |
| 3,289,571 | 12/1966 | Lewus | 99/446 X |
| 3,301,172 | 1/1967 | Haro | 99/446 |
| 3,978,782 | 9/1976 | Werling | 99/446 |
| 4,198,561 | 4/1980 | Fujioka | 219/454 X |
| 4,291,616 | 9/1981 | Taylor | 99/446 |

*Primary Examiner*—Samuel Scott
*Assistant Examiner*—Carl D. Price
*Attorney, Agent, or Firm*—George W. Finch

[57] ABSTRACT

A unit for placing on one or two burners of a gas or electric range, which applies air heated thereby to cook food on an elevated grill while catching fat, juices or sauces in a container kept cool enough by the internal construction thereof to prevent excessive smoking or cooking odors from escaping the unit. This is accomplished by providing a heat deflector, convection current diffuser which passes the heat from the burner around the fat receptacle and convects and radiates the heat onto the food.

11 Claims, 6 Drawing Figures

STOVE TOP GRILL

BACKGROUND OF THE INVENTION

Many homes employ inside broilers and barbeques, and outdoor barbeques whose use is limited by inclement weather, for cooking meat and other foods which tend to drip fat, juices or sauces while they are cooking. If these liquids are heated sufficiently, they smoke requiring extensive exhaust fans and duct work to eliminate. This is unfortunate, because it is generally desirable to apply heat directly to food rather than through a frying pan or other device as the unhealthful grease can escape and potential carcinagens are likely to be formed. Broiling from the top solves some of these problems, but the top applied heat, drives the flavorful juices out the bottom of the meat so the flavor suffers. Barbecues which apply heat from the bottom keep in the juices but the escaping fat and grease is heated to smoking of flash temperatures with the undesired smoke or fire. Many pre-existing stoves and range-tops do not provide means for direct heat application to food and if such is desired require expensive modification or replacement and those that do, do so in an inefficient manner. Therefore, there has been required an implement on which meats and other foods can be cooked inside the house during all seasons which can be used in conjunction with an ordinary range-top or stove and which applies the proper amount of, heat to the food to assure a flavorful and healthful cook thereof without food excess smoke and unusual odors and without drying out the food. Another requirement has been to provide an inplement to reduce energy consumption, both gas or electric during broiling or heating of food within the oven.

BRIEF DESCRIPTION OF THE INVENTION

The present invention includes upper and lower plenums with the device being placed so that the lower plenum is centrally located above the burner or burners of the range. At least one slightly truncated inverted pyramidal heat deflector is located within the lower plenum to deflect heated cooking air up and around a drip pan centrally located therein and evenly up through a grill supported in the upper plenum. The grill is positioned directly over the drip pan so that all fats and grease drip from the food or grill into the pan. The heat deflector assures that the grease, fat or juices falling in the pan therein from the meat, never need reach smoke or flash temperatures. The drip pan as well as the grill can be removed for convenient cleaning, and the upper plenum may include a moveable cover so that frozen prepared foods, baked potatoes or other broasted foods can be prepared at elevated temperatures. When a unit is designed for two burners, a heat deflector is provided over each burner for even distribution of the cooking heat and to avoid burning of the food drippings in the drip pan.

Therefore, it is an object of the present invention to provide a device for grilling food over one or more conventional stove burners while eliminating the smoke and mess normally attending such operations.

It is another object to provide a stove top grill which is relatively easy to construct, use and clean which does not produce excessive smoke.

Another object is to provide a grill device wherein the heat used for cooking is ducted in a controlled manner around an internal drip pan so that it need not reach smoking temperatures.

Another object is provide a stove-top grill which can be adapted to one or more burners.

These and other objects and advantages of the present invention will become apparent to those skilled in the art after considering the following detailed specification and the accompanying drawings, wherein:

DETAILED DESCRIPTION OF THE SHOWN EMBODIMENTS

Figure 1:
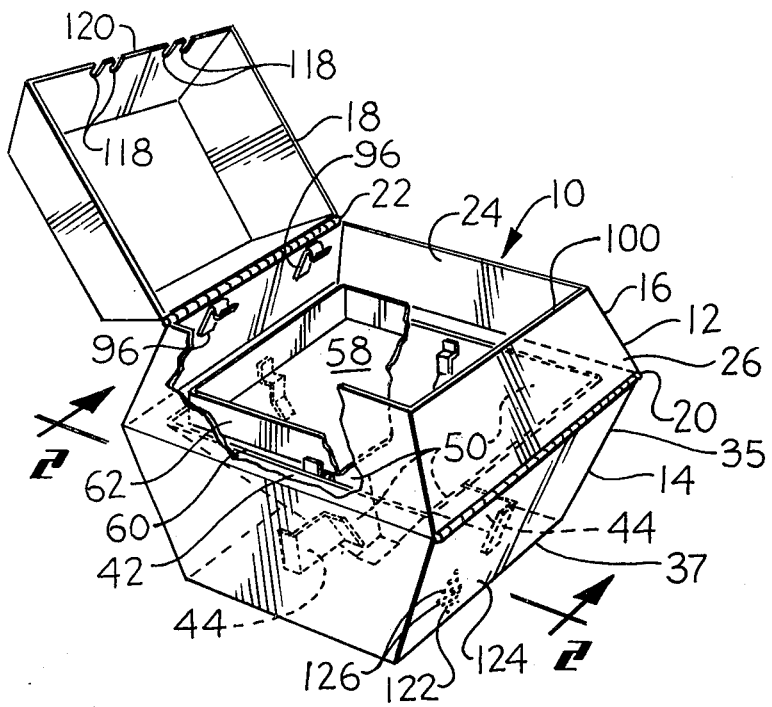
FIG. 1 is a partially cutaway perspective view of a single burner stove-top grill constructed according to the present invention.

Referring to the drawings more particularly by reference numbers, number 10 in FIG. 1 refers to a stove-top grill constructed according to the present invention. The stove-top grill 10 has a three-piece outer body 12 including a lower portion 14, a middle portion 16 and an optional top 18. The lower and middle portions 14 and 16 are held together by a suitable hinge such as the piano hinge 20 shown. A similar hinge 22 can be used to retain the middle portion 16 and optional top 18 together. However, it is preferable that if the hinge 22 is used it be of the type which allows the top 18 to be removed from the middle portion 16 when such is desired. The body 12, if not constructed from cast iron, cast aluminium, or stainless steel, is coated on its inner and outer surfaces 24 and 26 with a suitable heat resistant coating for appearance and to resist corrosion.

Figure 2:
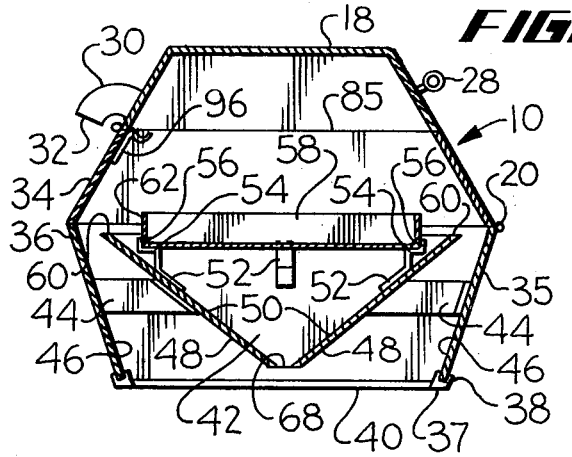
FIG. 2 is a cross-sectional view taken at line 2—2 in FIG. 1.

As can be seen in FIG. 2, the top 18 includes a suitable handle 28 for opening and a stop member 30 opposite thereto. The stop member 30 includes an abutment surface 32. When the top 18 is open, the abutment surface 32 rests against the back outer surface 34 of the middle portion 16 so the top 18 tends to remain in the stable open postion shown in FIG. 1, or closed as shown in FIG. 2. Since the hinges 20 and 22 are on the front 35 and back 36 of the body 12 respectively, the opening or closing of the top 18 does not generate any forces which unduly tend to open the middle portion 16 from the lower portion 14 about the hinge 20.

The lower portion 14 includes a lower edge 37 which defines a planar surface for resting upon a stove surrounding a burner thereof. The edge 37 may include a scratch preventative rim 38 thereover, preferably constructed from a heat resisting elastomeric to prevent the grill 10 from damaging the finish of the stove on which it is to rest. The lower edge 37 also defines an opening 40 in the lower portion 14 in which heat from the stove burner can rise.

Centrally above the opening 40 is a slightly truncated inverted pyramidal heat deflector 42 which is cradled at four locations by the side braces 44 shown. The side braces 44 are constructed with a relatively large height to width ratio so that they tend to streamline in the heated air which passes therearound when the grill 10 is in operation. Any suitable means can be used for attaching the side braces 44 between the inner surface 46 of the lower portion 14 and the outer triangular surfaces 48 of the heat deflector 42, such as spot welding or through the use of rivets or other fasteners, not shown. The heat deflector 42 can be attached to the side braces 44 although cleaning is easier if it is merely supported against gravity as shown. The inner surfaces 50 of the heat deflector 42 have support brackets 52 fixed thereto. Each of the brackets 52 has an upwardly facing support shelf portion 54 and an inwardly facing rim 56 which combine to support and retain a drip pan 58 therebetween.

As can be seen in FIG. 2, the upper edge 60 of the heat deflector 42 is positioned away from the inner surface 46 of the lower portion, and the outer edge 62 of the drip pan 58 is likewise supported away from the inner surfaces 50 of the heat deflector 42 so that a passageway 64 is defined around the heat deflector 42 between it and the inner surface 46 of the lower portion, and a passageway 66 is defined between the drip pan 58 and the inner surfaces 50 of the heat deflector 42. These passageways 64 and 66, as well as the small central passageway 68 created by the truncating of the heat deflector 42, are important in controlling the heat flow of the grill 10, as can be seen with reference to FIG. 3.

Figure 4:
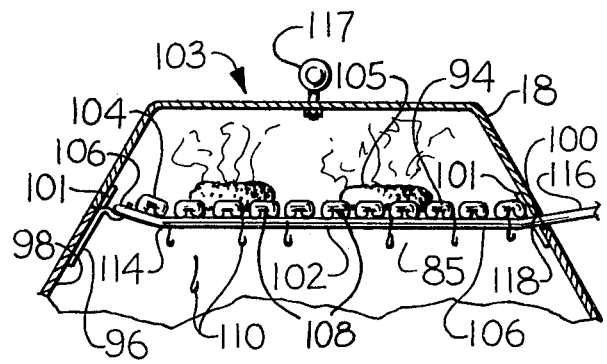
FIG. 4 is an enlarged detailed view of the upper plenum of a modified stove-top grill similar to that of FIGS. 1 and 2 with the grill thereof in position cooking food.
Figure 3:
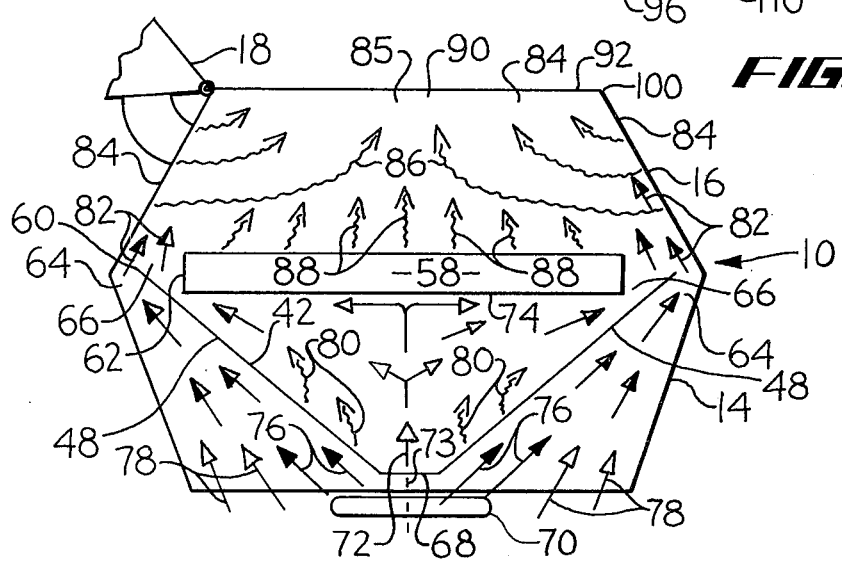
FIG. 3 is a diagrammatic cross-sectional view of the present invention showing the flow paths therethrough.

FIG. 3 is diagrammatic in form with the arrows 80, 86 and 88 therein with wavey tails indicating radiant heat, the arrows 76 therein with solid arrow heads indicating hot, convecting air from the stove burner 70, the arrows 72 and 78 with light arrow heads indicating ambient air, and the arrows 82 with arrowheads half dark and half light indicating mixed ambient and heated air. Gas or electric stove burners, such as electric burner 70, typically produce a ring of heat, and have a central cool spot so that cool ambient air represented by arrow 72 passes up through the middle 73 thereof. For this reason, the central passageway 68 is centered on the burner 70 so that the cool air, represented by arrows 72, tends to pass up through the passageway 68 until it impacts the bottom 74 of the drip pan 58. The hot air from the burner 70 indicated by the arrows 76 passes up the outer surfaces 48 of the heat deflector 42, as shown, and is mixed by the ambient air shown by arrows 78 at mixer ventures formed by the passageway 64. As can be seen, some heat passes through the heat deflector 42 and radiates as shown by arrows 80 toward the bottom 74 of the drip pan 58. This is undesirable and, is blocked by the cool air, represented by arrows 72, which carries the heat away through a mixing venturi formed by the passageway 66 about the drip pan 58. In this manner, the drip pan 58 is kept relatively cool. The mixed heated air indicated by the arrows 82 is deflected inwardly by the inwardly sloping sides 84 of the middle portion 16. These inwardly facing sides 84 also tend to re-radiate heat toward the center 85 of the grill 10 as shown by the radiant arrows 86. There is also some radiant heating off the drip pan 58 as shown by the radiant arrows 88. Therefore, the heat from the burner 70 is applied centrally about the drip pan 58 toward an upper opening 90 defined by the upper rim 92 of the middle portion 10. A grill 94, as shown in FIG. 4, is supported essentially co-planar with the rim 92 by means of a pair of bracket hooks 96 on the back inner surface 98 of the middle portion 16 and the front edge 100 of the rim 92. Top retaining brackets 101 can also be included in the modified embodiment 103.

The grill 94 includes longitudinal and lateral members 102 and 104 with the food 105 shown resting on the lateral members 104 since the longitudinal members 102 are underneath for support. The ends 106 and 108 of the longitudinal and lateral members respectively are bent upwardly about 8°. This is so grease droplets 110, if they do not drip directly off the food 105 into the pan 58, run along the members until the discontinuity such as discontinuity 114 formed by the bent up ends 106 and 108, at which point a droplet forms to fall into the pan 58. This is to prevent grease, juices or other drippings from falling at locations not shielded by the drip pan 58. The forward ends 116 of the longitudinal members 102 extend beyond the rim 92 to form handles for the grill 94 for removal. In FIG. 4 no hinge 22 is present, the top 18 including a central top handle 117 so that the top 18 can be totally removed by lifting upwardly.

As can be seen, the top 18 can be closed over the grill 94 if it is desired to increase the cooking temperature and to create an oven effect of wrap around heat on all surfaces to be cooked or heated that may require temperatures of 325° to 475°. These temperatures are typical when broasting or heating frozen food. Suitable notches 118 can be provided in the front upper edge 120 of the top 18 so that it can close down over the sidewardly extending ends 116 of the grill 94. Of course, when the top 18 is closed or the drip pan 58 is in place, it is difficult to determine the condition of the burner 70. This is especially troublesome if a gas burner is employed where the gas valve calibration does not accurately indicate the amount of heat being produced. For that reason, a view port 122 can be provided through the lower front panel 124 of the grill 10. The view port 122 includes a plurality of small holes 126 so that the condition of the burner 70 can be directly observed from outside the grill 10.

Figure 5:
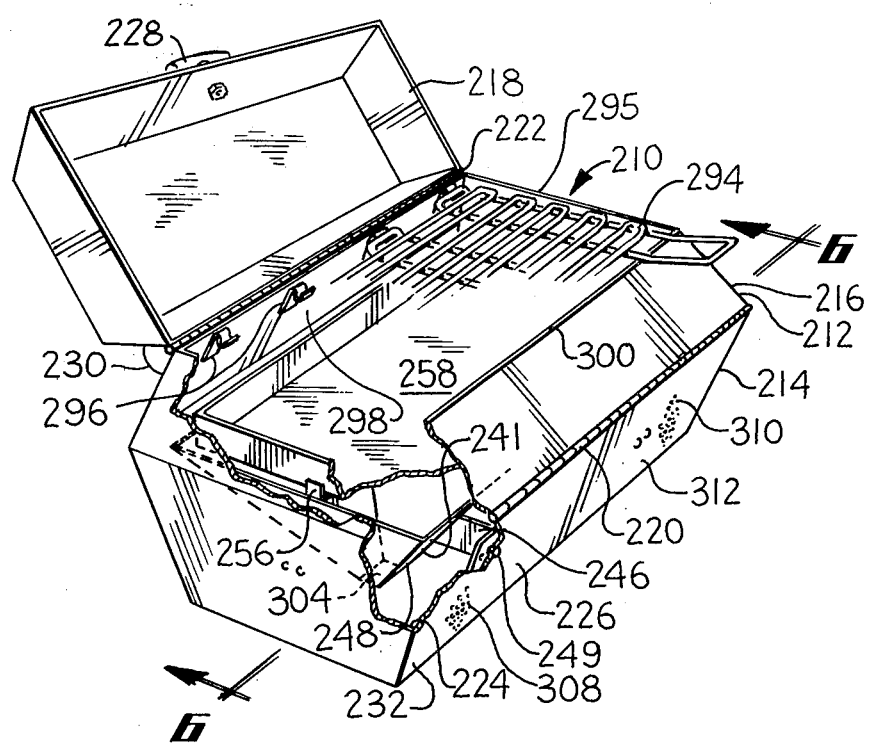
FIG. 5 is a partially cutaway perspective view of a two-burner embodiment of the present invention.
Figure 6:
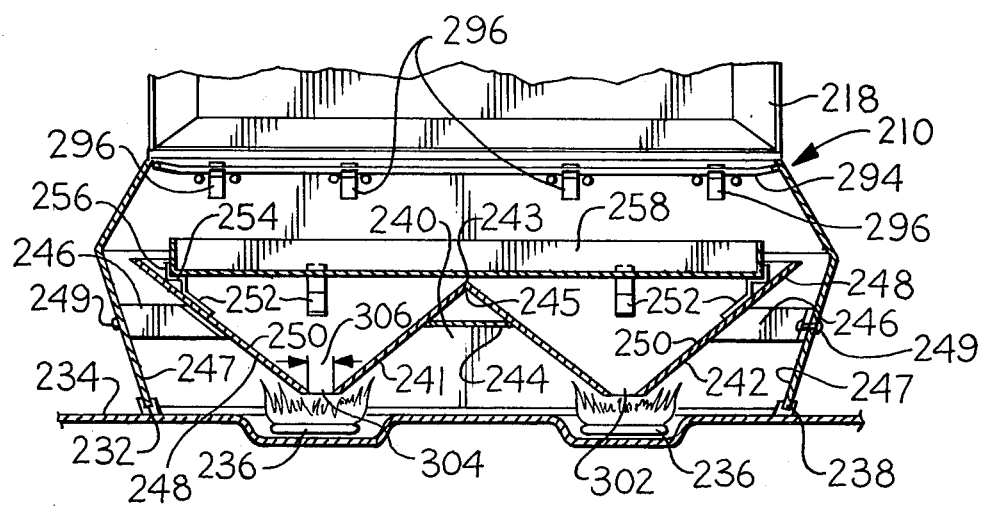
FIG. 6 is a cross-sectional view taken at line 6—6 on FIG. 5 of the two-burner embodiment in position on a two-burner range.

As can be seen with reference to FIGS. 5 and 6, the two grill embodiment 210 has essentially the same features as the one-burner embodiment shown in FIGS. 1 through 4. The grill 210 has a three-piece outer body 212 including the lower portion 214 and middle portion 216 and optional top 218. The lower and middle portions 214 and 216 are shown held together by a piano hinge 220 and likewise a similar hinge 222 is used to retain the middle portion 216 and the optional top 218 together. The hinge 222 may be of the removable type to allow the top 218 to be removed from the middle portion 216 when such is desired. This usually occurs when there is insufficient clearance for the top 218 to lay back, as shown, because of interference with the stove or an adjacent wall. The body 212 can be constructed from cast aluminium, cast iron, stainless steel or any other suitable material, and if constructed from sheet steel it preferrably is coated on its inner and outer surfaces 224 and 226 with a suitable heat resistant coating which maintains a pleasing appearance of the grill 210 and prevents corrosion. The top 218 may include a handle 228 suitably insulated so as to remain at a comfortable temperature for opening and closing the top 218. One or more stops 230 can be attached to the top 218 so that it tends to remain in the open position shown without flopping backwards to a position to unstabilize the grill 210.

The lower portion 214 includes a lower edge 232 for resting on a stove-top 234 surrounding two-burners shown as gas burners 236. The edge 232 may include a scratch preventative rim 238 to prevent the grill 210 from damaging the finish of the stove-top 234 on which is rests. The lower edge 232 also defines an opening 240 in the lower portion 214 in which heat from the stove burners 236 can rise.

Centrally above each of the burners 236 are slightly truncated pyramidal heat deflectors 241 and 242 connected at an inner edge 243. A wedge 244 is provided over the edge 243 to shunt heat out of the notch 245 and off to the sides. The heat deflectors 241 and 242 are supported by at least four side braces 246. The side braces 246, like side braces 44, are constructed with a relatively large height to width ratio so that they tend to streamline in the heated air which passes therearound when the grill 210 is in operation. Any suitable means can be used for attaching the side braces 246 between the inner surfaces 247 of the lower portion 214 and the outer triangular surfaces 248 of the heat deflectors 241 and 242, such as spot welding or through the use of rivets or other fasteners 249. The inner surfaces 250 of the heat deflectors 241 and 242 have support brackets 252 fixed thereto. Each of the brackets 252 has an upwardly facing support shelf portion 254 and inwardly facing rim 256 which combine to support and retain a drip pan 258 therebetween. When the burners 236 are on, the heat flows up and around the drip pan 258 like it flows around drip pan 58, shown in FIG. 3, so that the temperatures of the drip pan 258 are cool enough that excessive smoking can be prevented, yet there is direct application of heat to the grill 294 thereof. The grill 294 is supported essentially co-planar with the upper rim 295 of the middle portion 216 by a plurality of bracket hooks 296 attached to the back inner edge 298 of the middle portion 216. The grill 294 is supported between the hooks 296 and the front edge 300 of the rim 295. The grill 294 has grease retaining features similar to those of grill 94, it only being larger to cover the larger area encompassed by the stove-top grill 210.

It should be noted that the grill 210 is adaptable to most standard burner spacings. This is accomplished by making the holes 302 and 304 rectangular with their long dimension 306 in alignment with the spacing between the two burners 236. This enables the grill 210 to compensate for the minor spacing differences between standard burners 236. The orientation and flame height of the burners 236 can be observed through view ports 308 and 310 in the lower front surface 312 of the lower portion 214. When comparing the grills 10 and 210, it should be obvious that the heat deflectors 42, 241 and 242 are basically the same shape. This allows for easy production fabrication techniques reducing the parts count required for manufacture of the two devices 10 and 210.

Thus there has been shown and described novel stove-top grills which fulfill all the objects and advantages sought therefore. Many changes, modifications, variations and other uses and applications of the subject invention will, however, become apparent to those skilled in the art after considering this specification and the accompanying drawings. All such changes, modifications, alterations and other uses and applications which do not depart from the spirit and scope of the invention are deemed to be covered by the invention which is limited only by the claims which follow.

What is claimed is:

1. A device for applying heat to food, said heat supplied by a stove top burner, said stove top burner having a relatively cool air passage through the center thereof, said device including:
   a horizontal grill adapted to have food rested thereon;
   a body having an open bottom portion adapted to rest on the stove top around at least one of the stove top burners, a top portion adapted to support said grill a predetermined distance above the stove top, and a central portion;
   heat deflector means mounted spaced from said body within said central portion of said body, said heat deflector means including:
   at least one truncated, inverted pyramidal heat deflector defining an open top and open bottom, said defined open bottom being positioned within said body so as to be located centrally above the at least one stove top burner; and
   a drip pan mounted between said heat deflector means and said grill, said heat deflector means and said drop pan being sized and positioned to block direct line of sight communication between any burner about which said open body portion is resting and said horizontal grill while allowing convective heating paths between said open bottom portion and said horizontal grill.

2. The device for applying heat supplied by a stove top burner to food as defined in claim 1 wherein said horizontal grill is generally rectangular and at least one truncated, inverted pyramidal heat deflector includes:
   four side portions which define said open top and open bottom as a rectangular open top and a rectangular open bottom, said four side portions having inner and outer surfaces whereby said heat deflector causes relatively even heating at said horizontal grill.

3. The device for applying heat supplied by a stove top burner to food as defined in claim 2 wherein said at least one truncated, inverted pyramidal heat deflector further includes:
   a plurality of drip pan supports mounted to the inner surfaces of said heat deflector which removably support said drip pan spaced from said heat deflector four side portions in said defined open top.

4. The device for applying heat supplied by a stove top burner to food as defined in claim 3 wherein said horizontal grill includes:
   a plurality of lateral grill members, said lateral grill members having central portions and end portions, said lateral grill member end portions being formed to extend above said lateral grill member central portions when said grill is positioned on said body and said lateral grill member central portions being positioned above said drip pan; and
   a plurality of longitudional grill members, said longitudional grill members having central portions and end portions, said longitudional grill member end portions being formed to extend above said longitudional grill member central portions when said grill is positioned on said body and said lateral grill member central portions being positioned above said drip pan whereby the juices of cooking drip from said central portions of said lateral and longitudinal grill members into said drip pan.

5. The device for applying heat supplied by a stove top burner to food as defined in claim 4 wherein said drip pan includes:
   a bottom member; and side members, said side members each having a top lip which is located outwardly of said central portions of said lateral and longitudinal grill members.

6. The device for applying heat supplied by a stove top burner to food as defined in claim 1 wherein said body central portion includes:
   a lower central portion;
   an upper central portion; and
   hinge means connecting said upper central portion and said lower central portion together for relative pivoting movement therebetween.

7. The device for applying heat supplied by a stove top burner to food as defined in claim 1 wherein said body upper central portion includes:
   four upwardly extending sides which also extend inwardly as they extend upwardly to deflect heat inwardly toward said horizontal grill which is positioned thereabove.

8. The device for applying heat supplied by a stove top burner to food as defined in claim 7 further including a cover member sized and adapted to cover said open top of said body and said horizontal grill.

9. The device for applying heat supplied by a stove top burner to food as defined in claim 1 wherein said body open bottom includes a downwardly facing cushioned lip for resting on the stove top.

10. A device for applying heat supplied by a stove top burner to food, said device including:
    a grill;
    a body having an open bottom portion adapted to rest on the stove top around at least one of the stove top burners, a top portion adapted to support said grill a predetermined distance above the stove top, and a central portion;
    heat deflector means mounted spaced from said body within said central portion of said body, said heat deflector means including a pair of truncated, inverted pyramidal heat deflectors each defining an open top and open bottom, said defined open bottoms being positioned within said body so as to be located centrally above a stove top burner, said pair of truncated, inverted pyramidal heat deflectors including a common edge, said pair of truncated, inverted pyramidal heat deflectors being connected together at their upper open ends at said common edge, said heat deflector means including a heat deflecting wedge positioned below said common edge to deflect heat away therefrom; and
    a drip pan mounted between said heat deflector means and said grill.

11. The device for applying heat supplied by a stove top burner to food as defined in claim 10 wherein said open bottoms of said pair of truncated, inverted pyramidal heat deflectors each have a rectangular edge with parallel long sides and parallel short sides, said parallel long sides of said open bottoms of said pair of truncated, inverted pyramidal heat deflectors being in alignment.

* * * * *